United States Patent
Coffin et al.

[19]

[11] Patent Number: 6,042,205
[45] Date of Patent: Mar. 28, 2000

[54] MEDIA HOLDING DEVICE INCORPORATING A MEDIA LOCKING MECHANISM

[75] Inventors: Paul C. Coffin, Fort Collins, Colo.; Mark Ayars Smith, Holdrege, Nebr.; Robert L. Mueller, Windsor, Colo.

[73] Assignee: Hewlett-Packard Company, Palo Alto, Calif.

[21] Appl. No.: 09/318,586

[22] Filed: May 25, 1999

[51] Int. Cl.⁷ .................................................. A47B 88/00
[52] U.S. Cl. ..................... 312/332.1; 312/9.53; 312/9.64; 360/92; 369/178
[58] Field of Search .................................. 312/9.11, 9.12, 312/9.15, 9.16, 9.17, 9.21, 9.24, 9.25, 9.29, 9.36, 9.38, 9.53, 9.55, 9.56, 9.64, 222, 332.1; 16/900, 438; 369/178, 192; 360/92; 206/308.1, 387.1, 387.14, 387.15

[56] References Cited

U.S. PATENT DOCUMENTS

| | | | |
|---|---|---|---|
| 3,969,007 | 7/1976 | Lowry | 312/9.21 |
| 4,889,397 | 12/1989 | Ryan | 312/332.1 |
| 5,104,207 | 4/1992 | Lockhardt | 312/9.53 |
| 5,645,329 | 7/1997 | Madock | 312/9.17 X |
| 5,659,440 | 8/1997 | Acosta et al. | 360/92 |
| 5,720,387 | 2/1998 | Young | 312/9.11 X |
| 5,927,834 | 7/1999 | Todor | 312/221 |
| 5,936,795 | 8/1999 | Theobald et al. | 369/178 X |
| 5,940,354 | 8/1999 | Inoue | 360/92 X |

*Primary Examiner*—Peter R. Brown
*Assistant Examiner*—James O. Hansen

[57] ABSTRACT

A media holding device incorporating a media locking mechanism is disclosed herein. The media holding device comprises a housing comprising a plurality of media receiving bays formed therein; a plurality of detent mechanisms mounted on the housing and associated with the plurality of bays, each of the detent mechanisms having a media retaining operating position and a media releasing operating position; and a lock mechanism mounted on the housing and having a detent locking operating position and a detent releasing operating position, wherein the detent locking operating position locks the plurality of detent mechanisms in the media retaining operating position.

12 Claims, 4 Drawing Sheets

MEDIA HOLDING DEVICE INCORPORATING A MEDIA LOCKING MECHANISM

The present invention relates generally to a media holding device of the type used in an autochanger and, more particularly, to a media holding device incorporating a locking mechanism to secure media pieces within the media holding device.

BACKGROUND OF THE INVENTION

Autochangers are devices that store media pieces in a library, read data stored on the media pieces, and write data onto the media pieces. The media pieces are stored in a plurality of storage slots, sometimes referred to as a library, which is located within the physical structure of the autochanger. At least one media "player" or "drive" is also located within the physical structure of the autochanger and serves to read and write data from and to the media pieces. A media handling device, often referred to herein simply as a picker, is located within the autochanger and serves to transport the media pieces between the library and the media player.

Autochangers may be adapted to operate with several different media formats, thus, "media pieces" may comprise optical discs, magnetic discs, and magnetic tapes, e.g., digital linear tapes, CD's etc. The digital linear tape is a common media format used in autochangers. A digital linear tape is a magnetic linear tape that is stored within a cartridge. The cartridge has a door that, when opened, exposes a leader portion of the tape which is located at a predetermined position relative to the cartridge. When the cartridge is placed inside the media player, the media player opens the door, grabs the leader and feeds the tape across a read/write head and to a pick up reel. When the tape is no longer required to be located in the media player, the media player rewinds the tape into the cartridge so that the leader is accessible for the next time the cartridge is used. If the leader is not located in the predetermined position, the media player will be unable to use the tape because it will not be able to feed the tape through the media player.

The library portion of an autochanger may comprise a removable magazine that is used to store media pieces. The magazine typically has a plurality of holding locations or slots adapted to hold the media pieces. A user places the media pieces into the holding locations in the magazine and then places the magazine into the library portion of the autochanger. When a specific media piece is required to be transported from the magazine to the media player, the picker extracts the media piece from the library, moves it to the media player, and inserts it into the media player. Likewise, when a media piece is no longer required in the media player, the picker reverses the above-described procedure and transports the media piece from the media player to the magazine. The autochanger tends to be a very compact unit, therefore, the picker typically comes in close proximity to the media pieces located in the magazine as it moves throughout the autochanger.

The media pieces are secured in the holding locations in order to keep them from inadvertently slipping out of the magazine. The user may, as an example, inadvertently tilt a magazine that is filled with media pieces. If the media pieces are not secured, they may fall out of the magazine and become damaged. In the case of a digital linear tape, the leader portion of the tape may become dislodged from its aforementioned predetermined position to a position where it is inaccessible by the media player. This will render the digital linear tape unusable by the autochanger because the tape will not be able to be fed through the media player.

Unsecured media pieces may also become dislodged from the magazine when the magazine is placed into the library portion of the autochanger. The user of the autochanger may, as an example, tilt the magazine as it is being placed into the autochanger, which may result in media pieces becoming dislodged from their respective holding locations. In another example, the user may transport the autochanger that has been loaded with media pieces. If the user transports the autochanger and inadvertently collides the autochanger with another object, the media pieces may become dislodged from their respective holding locations. In the case of either of the above-described situations, a media piece will be located at an improper location inside of the autochanger. When the picker moves within the autochanger, it may impact an improperly located media piece, which will likely result in damage to the components comprising the autochanger and the media piece.

As described above, there are two circumstances that may cause the media pieces to become dislodged from the magazine. The first circumstance is by the user inadvertently tilting the magazine. This may cause the media pieces to fall to a floor and become damaged. The second circumstance is if the user tilts the magazine as it is being loaded into the autochanger or causes the autochanger to strike an object. This may cause the media pieces to be located in the path of the picker, which may damage the autochanger or the picker. A detent mechanism may be used in the magazine in order to secure the media pieces within the magazine. It has been found that a detent mechanism must apply a greater force to keep the media pieces secured when the magazine is tilted external to the autochanger than to keep the media pieces from becoming dislodged within the autochanger.

The force associated with the detent mechanism requires that the picker apply a substantial force to the media pieces in order to remove them from the magazine. Overcoming this substantial force typically requires that the picker exert a force of between two and three pounds on the media pieces. This force has been found to be the greatest force that the picker is required to exert.

Overcoming this securing force requires that the picker use substantially strong components and consume significant power. For example, the picker is required to operate a servo mechanism that is capable of overcoming the securing force and that will not wear when it overcomes the securing force. This requires the use of a heavy and generally expensive servo motor and other components that comprise the servo mechanism. Furthermore, the servo motor must draw a significant amount of power from the autochanger in order to overcome the securing force, which requires that the autochanger be provided with a power supply that is capable of delivering relatively high power to the picker. This may significantly increase the size, cost, and weight of the autochanger.

Therefore, a need exists for a magazine that is capable of securing media pieces within the magazine, while allowing the media pieces to be extracted by an application of a minimal force from the picker.

SUMMARY OF THE INVENTION

The invention may comprise a media holding device. The media holding device includes a housing having at least one media holding location formed therein. A spring mechanism is attached to the housing, the spring mechanism has a first end and a second end. A locking element extends into the media holding location and is operationally attached to the spring mechanism second end. A lever mechanism having a first portion and an engagement portion is pivotally attached to the housing. The lever mechanism first portion is pivotally attached to the housing, wherein the engagement portion of the lever mechanism is located at a first position or a second position. When the engagement portion is located at the first position, the engagement portion contacts the locking element and when the engagement portion is located at the second position, the engagement portion does not contact the locking element.

The invention may also comprise a media holding device incorporating a locking mechanism. The media holding device may include a housing comprising a plurality of media receiving bays formed therein. A plurality of detent mechanisms are mounted on the housing and associated with the plurality of bays. Each of the detent mechanisms has a media retaining operating position and a media releasing operating position. A lock mechanism mounted on the housing having a detent locking operating position and a detent releasing operating position. The detent locking operating position locks the plurality of detent mechanisms in the media retaining operating position.

The invention may also comprise a method of securing a media piece within a media holding device. The method may comprise locating a media piece in a media holding location in a media holding device; locating a media piece in at least one media holding location in a media holding device; engaging a detent element with the media piece as the media piece is removed from the at least one media holding location; applying a first force between the detent element and the engaged media piece as the media piece is removed from the at least one media holding location; engaging the detent element with a locking mechanism which causes a second force greater than the first force to be applied between the detent element and the media piece as the media piece is removed from the at least one media holding location.

The invention may also comprise a means for securing a media piece. The means includes a media holding means for holding a media piece. A detent means for releasably contacting the media piece as the media piece is removed from the media holding means. A locking means for releasably locking the detent means in a position which prevents removal of the media piece from the media holding means.

BRIEF DESCRIPTION OF THE DRAWING

An exemplary embodiment of the invention is shown in the accompanying drawing in which.

DETAILED DESCRIPTION OF THE INVENTION

FIGS. 1 through 4, in general, describe a media holding device 100 comprising: a housing 104 having at least one media holding location 130 formed therein; a spring mechanism 200 comprising a first end 210 and a second end 224, the first end 210 being operationally attached to the housing 104; a locking element 500 extending into the at least one media holding location 130, the locking element 500 being operationally attached to the spring mechanism second end 224; a lever mechanism 300 comprising a first portion 316, 334 and an engagement portion 320, 338, the lever mechanism first portion 316, 334 being pivotally attached to the housing 104, wherein the engagement portion 320, 338 of the lever mechanism 300 is located at a first position or a second position; wherein when the engagement portion 320, 338 is located at the first position, the engagement portion 320, 338 contacts the locking element 500; and wherein when the engagement portion 320, 338 is located at the second position, the engagement portion 320, 338 does not contact the locking element 500.

FIGS. 1 through 4 also, in general, describe a media holding device 100 comprising: a housing 104 comprising a plurality of media receiving bays 130 formed therein; a plurality of detent mechanisms 212 mounted on the housing 104 and associated with the plurality of bays 130, each of the detent mechanisms 212 having a media retaining operating position and a media releasing operating position; a lock mechanism 360 mounted on the housing 104 and having a detent locking operating position and a detent releasing operating position, wherein the detent locking operating position locks the plurality of detent mechanisms 212 in the media retaining operating position.

FIGS. 1 through 4 also, in general describe method of securing a media piece within a media holding device 100 comprising: locating a media piece 400 in at least one media holding location 132 in a media holding device 100; engaging a detent element 510 with the media piece 400 as the media piece 400 is removed from the at least one media holding location 132; applying a first force between the detent element 510 and the engaged media piece 400 as the media piece 400 is removed from the at least one media holding location 132; engaging the detent element 510 with a locking mechanism 360 which causes a second force greater than the first force to be applied between the detent element 510 and the media piece 400 as the media piece 400 is removed from the at least one media holding location 132.

FIGS. 1 through 4 also, in general describe a means for securing a media piece 400 comprising: a media holding means 100 for holding a media piece 400; a detent means 200 for releasably contacting the media piece 400 as the media piece 400 is removed from the media holding means 100; a locking means 360 for releasably locking the detent means 200 in a position which prevents removal of the media piece 400 from the media holding means 100.

Figure 1:
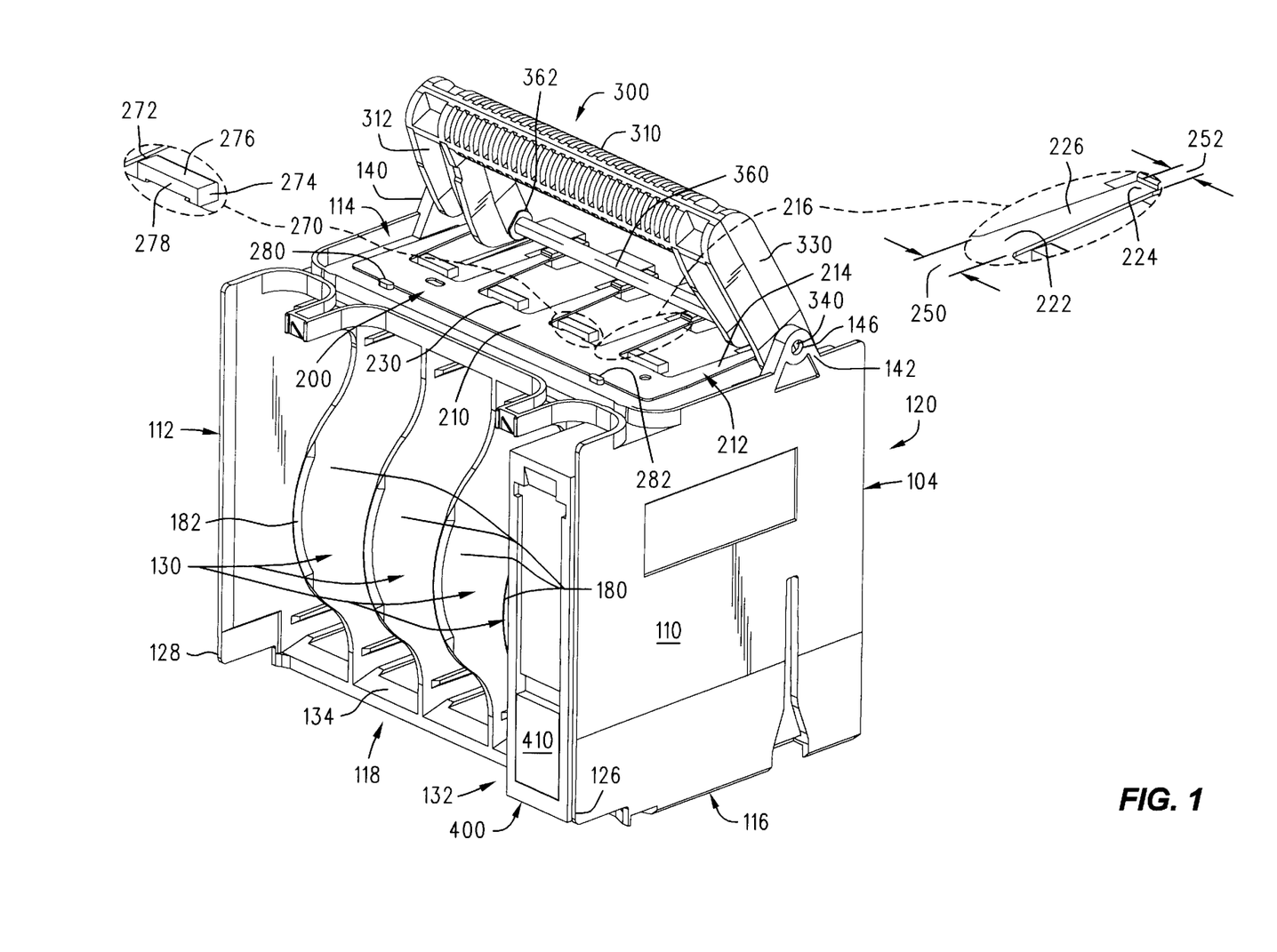
FIG. 1 is a front perspective view of a magazine.

Referring to FIG. 1, the magazine 100, in summary, provides two mechanisms, which provide force for securing media pieces within the magazine 100. A spring mechanism 200, sometimes referred to herein as a detent mechanism, may be attached to the magazine 100 and may serve to apply a relatively small force to secure the media pieces within the magazine 100. A handle 300 may be coupled to a lock bar 360 and may serve to apply an additional force to secure the media pieces within the magazine 100. Specifically, when the handle 200 is lifted, the lock bar 360 may engage the spring mechanism 200 and may apply the additional force to secure the media pieces within the magazine 100.

Having summarily described the magazine 100, it will now be described in further detail. FIG. 1 is a front perspective view of a magazine 100 that is used to store media pieces. The magazine 100 may be placed into the library of an autochanger, not shown. The magazine 100 illustrated in FIG. 1 is depicted as being adapted to store digital linear tape cartridges, of which, the digital linear tape cartridge 400 is an example. It is to be understood, however, that the magazine 100 and the components thereof may be adapted to store other forms of media.

The magazine 100 may have a housing 104 to which a handle 300 and a spring mechanism 200 may be attached. The housing 104 may have a right portion 110, a left portion 112, a top portion 114, a bottom portion 116, a front portion 118, and a back portion 120. The right portion 110 may extend to the proximity of the front portion 118 and may form an edge 126. Likewise, the left portion 112 may extend to the proximity of the front portion 118 and may form an edge 128. The front portion 118 may have a plurality of slots 130, sometimes referred to herein as media holding locations or bays. The slots 130 may be formed by locating a plurality of spaced dividers 180 within the housing 104, wherein the dividers 180 are parallel to the right portion 110 and the left portion 112. The dividers 180 may have beveled edges 182 that serve to guide the media pieces into the slots 130. The slots 130 may have inclined surfaces 134 on the bottom portion 116 that also serve to guide the media pieces into the slots 130. The digital linear tape cartridge 400 is illustrated as being located in a slot 132.

Figure 2:
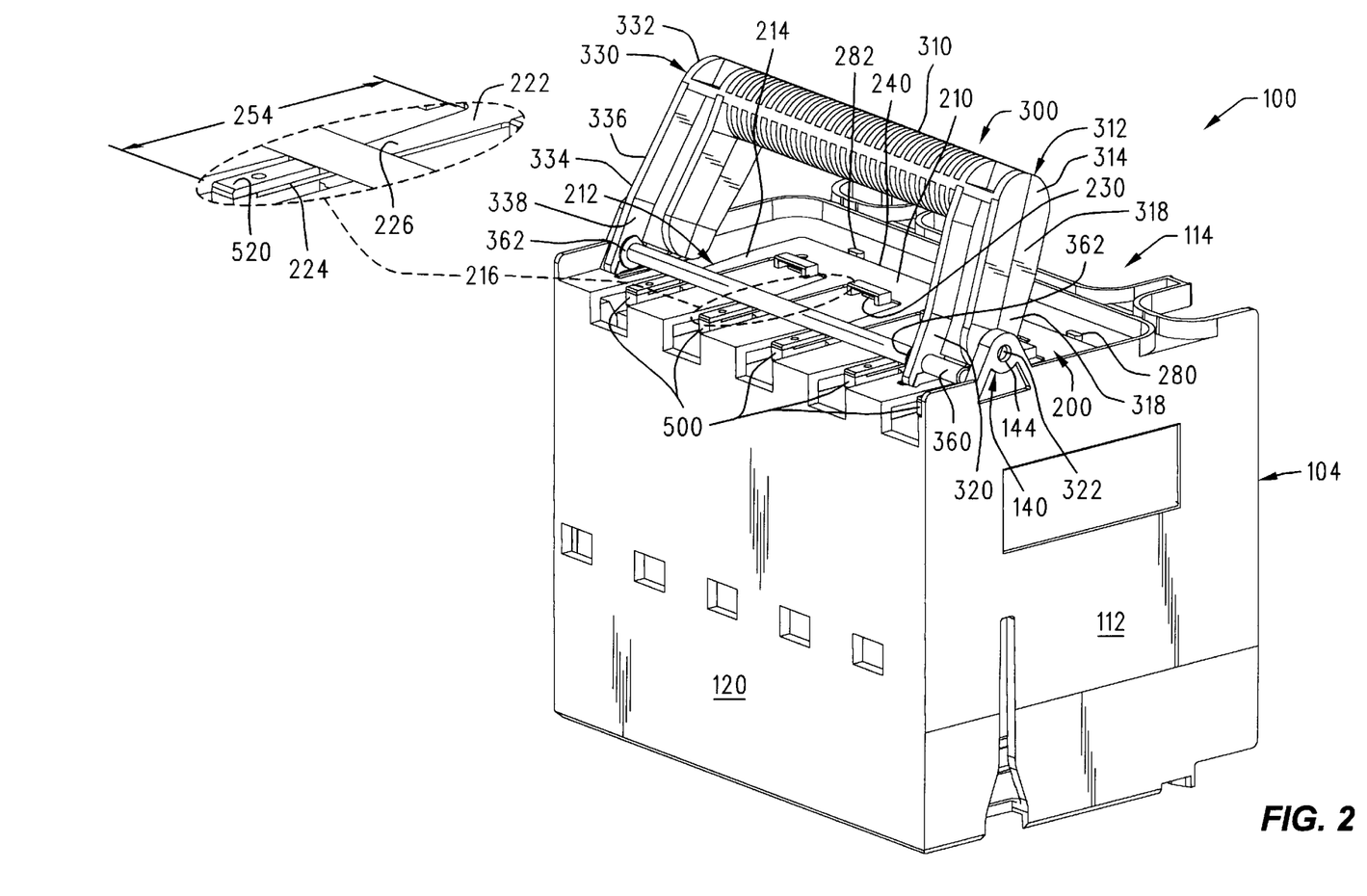
FIG. 2 is a back perspective view of the magazine of FIG. 1.

The right portion 110 of the housing 104 may have a right hinge portion 142 that extends upward beyond the top portion 114. The left portion 112 of the housing 104 may have a similar left hinge portion 140 that extends upward beyond the top portion 114. The right hinge portion 142 may have a hole 146 formed therein. The left hinge portion 140 may also have a hole 144 formed therein, which is illustrated in FIG. 2. Referring again to FIG. 1, the hinge portions 140 and 142 may serve to pivotally attach the handle 300 to the housing 104 as will be described further below.

The top portion 114 of the housing 104 may have a plurality of devices that are used to secure the spring mechanism 200 to the housing 104. The top portion 114 may have a plurality of spring locks 270. A spring lock 270 may have a left portion 272, a right portion 274, a top portion 276, and an opening 278. The left portion 272 and the right portion 274 may extend normal to the top portion 114 of the housing 104. The top portion 276 of the spring lock 270 may extend between the left portion 272 and the right portion 274 to form the opening 278. The spring locks 270 may, as an example, be integrally formed into the top portion 114 of the housing 104. The top portion 114 of the housing 104 may also have a left spring guide 280 and a right spring guide 282 integrally formed into the top portion 114. The spring guides 280 and 282 may serve to align the spring mechanism 200 relative to the top portion 114 of the housing 104 as described below.

FIG. 2 is a rear perspective view of the magazine 100 that better illustrates the spring mechanism 200. The spring mechanism 200 may be attached to the top portion 114 of the housing 104 as described below. The spring mechanism 200 may have a mounting portion 210 and a plurality of fingers 212 of which, the fingers 214 and 216 are examples. The finger 216 may have a front portion 222, a back portion 224, and a mid-portion 226. The front portion 222 may have a width 250, e.g., approximately 7 millimeters. The back portion 224 may have a width 252, FIG. 1, e.g., approximately 4 millimeters. The finger 216 may have a length 254, e.g., approximately 40 millimeters. The tapered shape of the finger 216 allows for a greater deflection of the finger 214 relative to a nontapered finger when the same stress is applied to both types of fingers.

The mounting portion 210 may have a plurality of spring tabs 230 located opposite a front edge 240. The front edge 240 may abut the left alignment tab 280 and the right alignment tab 282. The spring tabs 230 may be adapted to fit in the openings 278 of the spring locks 270. The combination of the alignment tabs 280 and 282 and the spring locks 270 allows the spring mechanism to be attached to the top portion 114 of the housing 104 without the need of fasteners. They further properly align the spring mechanism relative to the housing 104.

The spring mechanism 200 may, as an example, be made from a single sheet of 301 stainless steel, extra hard, that is approximately 0.635 millimeters thick. The use of extra hard stainless steel reduces the probability of the spring mechanism 200 failing due to fatigue. The stiffness of the fingers 212 may be selected by known mechanical techniques involving selecting the material of the spring mechanism, the thickness of the material, the widths of the fingers 212, and other factors that are known in the art.

Figure 3:
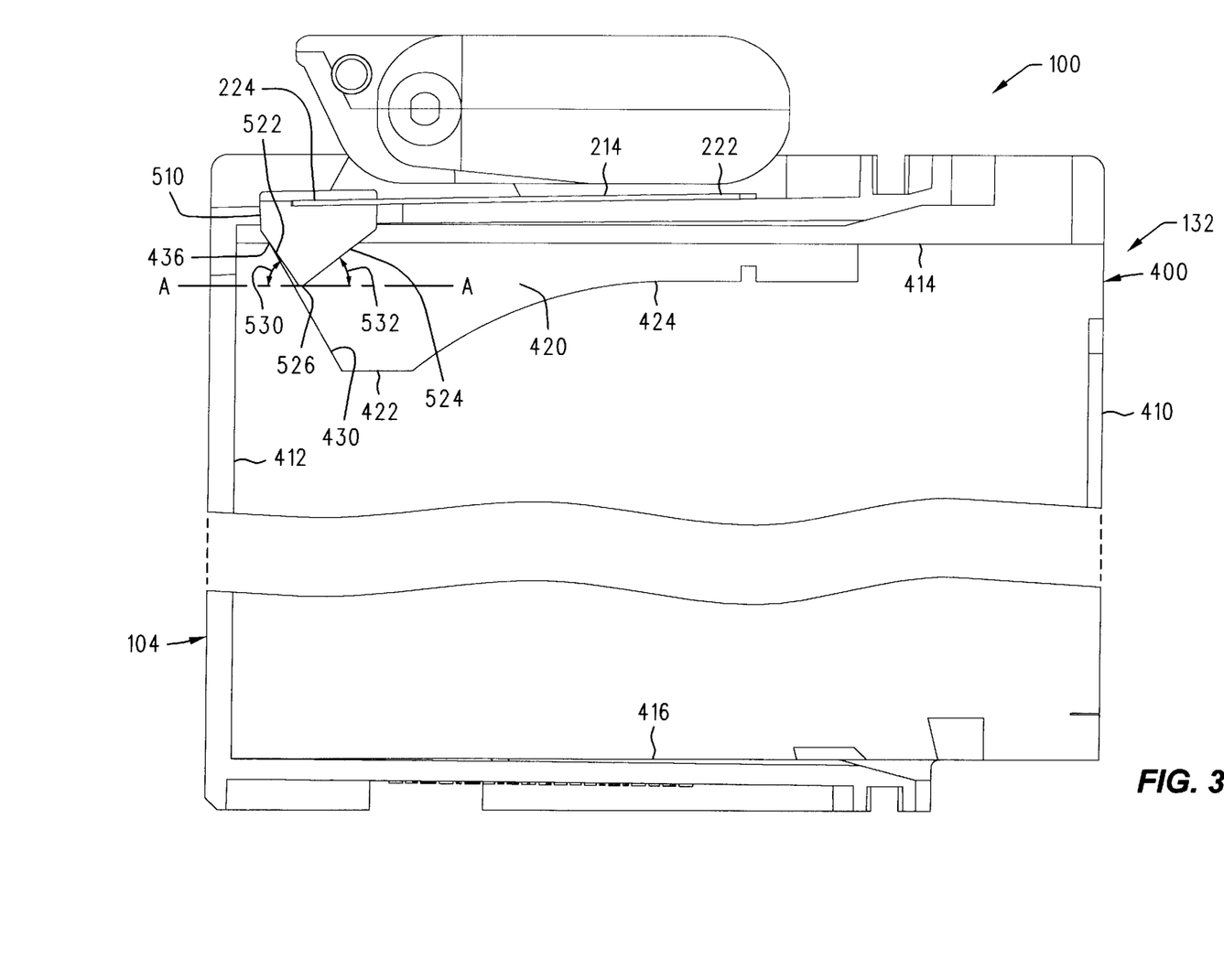
FIG. 3 is a cut away side view of the magazine of FIG. 1 and a digital linear tape cartridge stored in the magazine.

Locking elements 500 may be affixed to the back portions 224 of the fingers 212. The locking elements 500 may serve to secure the media pieces in the housing 104. FIG. 3 provides a cut away view of the magazine 100 illustrating a locking element 510 attached to the finger 214. The locking element may, as an example, be molded from a blend of 610 nylon, which is commercially available from the LNP Engineering Plastics Company of Exton, Pa. as product number QCL-4036. The locking element 510 may, as an example, be attached to the back portion 224 of the finger 214 by molding over the locking element 510 onto the finger 214 as is known in the art.

The locking element 510 may be generally triangle-shaped with a top portion 520, a back portion 522, and a front portion 524. The back portion 522 and the front portion 524 may intersect at a point 526. A reference line AA may extend parallel to the top portion 520 and may intersect the point 526. A back angle 530, e.g., 55 degrees, may exist between the reference line AA and the front back portion 522. A front angle 532, e.g., 38 degrees, may exist between the reference line AA and the front portion 524. The locking element 510, as illustrated in FIG. 3, may serve to secure the digital linear tape cartridge 400 in the magazine 100.

FIG. 3 also illustrates a cut away view of the digital linear tape cartridge 400 located in the slot 132. The digital linear tape cartridge 400 may have a front side 410, a back side 412, a top side 414 and a bottom side 416. The dimensions of the digital linear tape cartridge 400 may be appropriately sized so that it fits within the slot 132 in the housing 104. The top side 414 may have a cut out portion 420 defined by a front portion 424, a lower portion 422, and a back portion 430. When the digital linear tape cartridge 400 is located in the slot 132, the back portion 430 may contact the back portion 522 of the locking element 510 at an intersection point 436.

Referring again to FIG. 2, the housing 104 may have a handle 300 pivotally attached to the left portion 112 and the right portion 110 of the housing in the proximity of the top portion 114. The handle 300 may have a grasp 310, a left support 312, a right support 330, and a lock bar 360. The right support 330 may be substantially similar to the left support 312. The left support 312 may have an upper portion 314, a lower portion 316, a middle portion 318, and lock portion 320. A pin 322 may extend normal to the lower portion 316. The pin 322 may pass through the hole 144 in the hinge portion 140 of the left portion 112 of the housing 104. The right support 330 may have an upper portion 332, a lower portion 334, a middle portion 336 and a lock portion 338. The lower portion 334 may have a pin 340, FIG. 1, extending normal from the lower portion 334 in a similar manner as the pin 322. The pin 340, FIG. 1, may pass through the hole 146 in the hinge portion 142 of the right portion of the housing 104. The handle 300 may, thus, pivot relative to the housing 104 about an axis defined by the pin 322 and the pin 340, FIG. 1.

The lock bar 360 may extend between the lock portion 320 of the left support 312 and the lock portion 338 of the right support 330. Specifically, the lock bar 360 may extend through the lock portion 320 and the lock portion 338. A right snap ring 360 and a left snap ring 362 may be attached to the lock bar 360 in a conventional manner so as to keep the lock bar 360 from sliding relative to the handle 300. The lock bar 360 may be situated relative to the handle 300 so that when the handle 300 is in the position illustrated in FIG. 2, the lock bar 360 contacts the top portion 520 of the locking elements 500.

Having described the physical layout of an embodiment of the magazine 100, a method of using the magazine 100 will now be described. In summary, the magazine 100 provides two modes for securing media pieces within the magazine 100, a detent locking mode and a release mode. Both modes secure the media pieces, however, the detent locking mode applies a greater force to secure the media pieces than the release mode applies. The detent locking mode is activated by lifting the handle 300 from the position illustrated in FIG. 4 to the position illustrated in FIG. 2. When the magazine 100 is in the detent locking mode, the lock bar 360 contacts the lock elements 500 to apply a relatively strong force to secure the media pieces within the magazine 100. The release mode is activated by placing the handle 300 in the position illustrated in FIG. 4. When the magazine 100 is in the release mode, the lock bar 360 does not contact the lock elements 500, thus, only the force applied by the spring mechanism 200 secures the media pieces in the magazine 100. The force applied by the spring mechanism 200 is generally much less than the force applied by the lock bar 360.

Having summarized a method of using the magazine 100, the method will now be described in detail. The following description focuses on securing the digital linear tape cartridge 400 in the slot 132, FIG. 1. The following description focuses on pushing the digital linear tape cartridge 400 into the slot 132 wherein after the digital linear tape cartridge 400 has been pushed into the slot 132, it will appear as illustrated in FIG. 3.

Referring to FIG. 3, the stiffness of the finger 214 serves to maintain the lock element 510 in the position illustrated in FIG. 3. A force is applied to the digital linear tape cartridge 400 to push it into the slot 132. As the digital linear tape cartridge 400 is slid into the slot 132, the front side 412 of the digital linear tape cartridge 400 contacts the front portion 524 of the lock element 510. The force acting to push the digital linear tape cartridge 400 into the slot causes a deflective force to be applied to the finger 214 via the lock element 510. Specifically, a portion of the force used to push the digital linear tape cartridge 400 into the slot 132 deflects the finger 214 and, thus, lifts the lock element 510 allowing the digital linear tape cartridge 400 to enter the slot 132. The amount of deflection relative to the stress force applied to the finger 214 is related to the stiffness of the finger 214, the angle 532, the composition of the material comprising the lock element 510, and the composition of the material comprising the digital linear tape cartridge 400. This stress force is proportional to the angle 532, thus, the larger angle 532 is, the greater the force that is required to push the digital linear tape cartridge 400 into the slot 132.

Another factor affecting the force required to insert and extract the digital linear tape cartridge 400 is the frictional force between the components. The composition of the material comprising the lock element 510 and the composition of the material comprising the digital linear tape cartridge 400 establishes a coefficient of friction between the digital linear tape cartridge 400 and the lock element 510. This coefficient of friction affects the force required to push the digital linear tape cartridge 400 into the slot 132. The coefficient of friction also affects the force required to extract the digital linear tape cartridge 400 from the slot 132. The compositions of the digital linear tape cartridge 400 and the lock element 510 may be selected so as to achieve a desired coefficient of friction.

The digital linear tape cartridge 400 is pushed into the slot 132 until the point 526 on the lock element 510 encounters the back portion 430 of the cut out 420 in the digital linear tape cartridge 400. At this point, the finger 214 returns to its original, undeflected position and secures the digital linear tape cartridge 400 into the slot 132.

Figure 4:
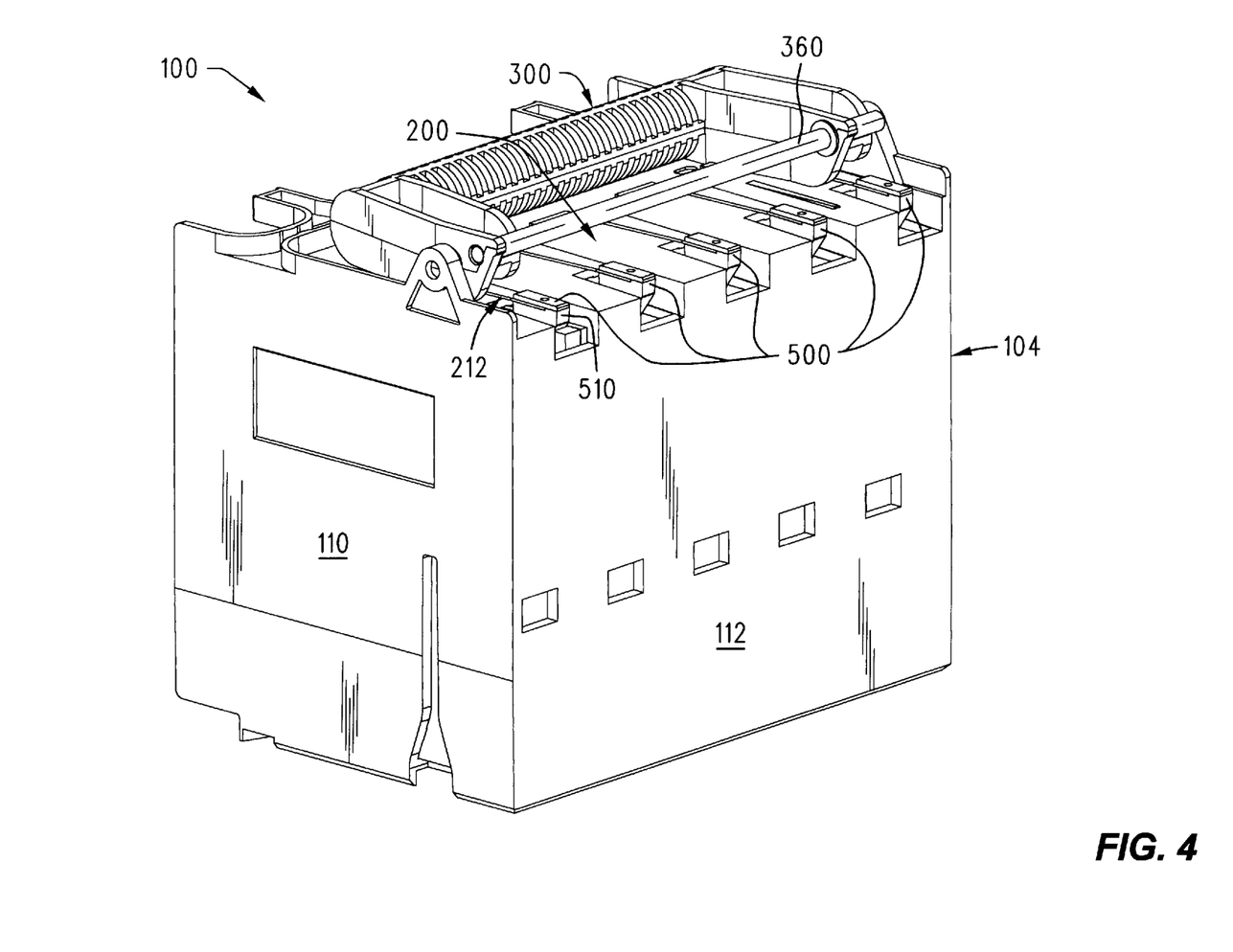
FIG. 4 is a back perspective view of the magazine of FIG. 1.

When the magazine 100 is in the release mode, the lock bar 360, FIG. 4, does not contact the lock elements 500. In this mode, the digital linear tape cartridge 400 located in the slot 132 is secured by the stiffness of the finger 214 applying a force between the lock element 510 and the digital linear tape cartridge 400, FIG. 3. A force applied to remove the digital linear tape cartridge 400 from the slot 132 must deflect the finger 214 in order for the lock element 510 to lift and allow the digital linear tape cartridge 400 to be removed. The incline of the back portion 430 of the digital linear tape cartridge 400 and the back angle 522 of the lock element 510 disburse the above-described force to lift the lock element 510. The angle 522 is relatively large, thus, a small portion of the force used to remove the digital linear tape cartridge 400 is applied to deflect the finger 214. Accordingly, a relatively large force is required to remove the digital linear tape cartridge 400. This force may be selected so as to keep the digital linear tape cartridge 400 secure in the magazine 100 while the autochanger is operating. The force to remove the digital linear tape cartridge 400 as illustrated herein is typically between two and three pounds.

Referring to FIG. 2, when the magazine 100 is in the detent lock mode, the handle 300 is raised, causing the lock bar 360 to be positioned so that it contacts the locking elements 500. The handle 300 may, as an example, be raised by a user who is using the handle 300 to carry the magazine 100. The lock bar 360 exerts a force on the locking elements 500 via a force created by the lifting of the handle 300. The amount of force applied to the locking elements 500 is primarily dependent on the force applied at the grasp 310, the lengths of the left support 312 and the right support 330, the distance between the lock bar 360 and the pin 332, and the location of the lock bar 360 relative to the pin 332. As the mass of the magazine 100 increases with each additional piece of media inserted into the slots 130, the force applied to the locking elements 500 increases proportionally due to gravitational force. It is generally desirable to have the lock bar 360 apply the greatest force possible to the lock elements 500 in order to assure that the digital linear tape cartridge 400 does not become dislodged from the magazine 100.

Having described the two modes of operation of the magazine 100, their uses will now be described. The release mode is used to insert and extract digital linear tape cartridges from the magazine 100. The force securing the digital linear tape cartridges into the magazine is generally small, allowing for ease in extracting and inserting the digital linear tape cartridges. The force, however, is large enough to secure the digital linear tape cartridges as the magazine 100 is inserted into the autochanger. The force is also large enough to secure the digital linear tape cartridges in the event the autochanger is struck or strikes an object. The structure of the autochanger may be configured such that the handle 300 is forced down when the magazine 100 is inserted into the autochanger, thereby assuring that the magazine 100 is in the release mode when it is located within the autochanger. The detent locking mode is used when the magazine 100 is being carried by a user.

When the magazine 100 is located outside of the autochanger, the user will generally carry the magazine 100 by the handle 300. This causes the handle 300 to lift as illustrated in FIG. 2, which places the magazine 100 into the detent locking mode and assures that the digital linear tape cartridges will not become dislodged from the magazine 100.

Several embodiments may be incorporated into the magazine 100. Referring to FIG. 2, in one embodiment, the lock bar 360 contacts the mid-portion of the fingers 212, e.g., the mid-portion 226 of the finger 214, when the handle 300 is in the detent locking mode. This embodiment will apply a similar force on the locking elements 500 to secure the digital linear tape cartridges as was described above. Design and manufacturing constraints may make this embodiment more feasible than having the lock bar 350 contact the locking elements 500. In another embodiment, a lock portion of a handle support contacts a locking element directly, e.g., the lock portion 320 of the support 312 may contact the lock element 510.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A media holding device comprising:
   a housing having at least one media holding location formed therein;
   a spring mechanism comprising a first end and a second end, said first end being operationally attached to said housing;
   a locking element extending into said at least one media holding location, said locking element being operationally attached to said spring mechanism second end;
   a lever mechanism comprising a first portion and an engagement portion, said lever mechanism first portion being pivotally attached to said housing, wherein said engagement portion of said lever mechanism is located at a first position or a second position; said lever mechanism further comprises a first side, a second side, and a handle; wherein said first side and said second side each have a pivotal portion; wherein said pivotal portions are pivotally attached to said housing; and wherein said handle and said engagement portion extend between said first side and said second side;
   wherein when said engagement portion is located at said first position, said engagement portion contacts said locking element; and
   wherein when said engagement portion is located at said second position, said engagement portion does not contact said locking element.

2. The device of claim 1 wherein said locking element is comprised of a polymer.

3. The device of claim 2 wherein said locking element is molded over said spring mechanism second end.

4. The device of claim 1 wherein said locking element is substantially triangular-shaped and wherein two sides of said substantially triangular-shaped locking element extend into said at least one media holding location.

5. The device of claim 1 wherein said engagement portion is a rigid member.

6. The device of claim 1 wherein said spring mechanism comprises a metallic strip.

7. The device of claim 1 wherein said spring mechanism is fabricated from 301 stainless steel.

8. The device of claim 1 wherein said spring mechanism further comprises a mid-section; wherein said mid-section is located between said spring mechanism first end and said spring mechanism second end; wherein when said engagement portion is in said first position, said engagement portion contacts said spring mechanism mid-section; and wherein when said engagement portion is in said second position, said engagement portion does not contact said spring mechanism mid-section.

9. A media holding device comprising:
   a housing comprising a plurality of media receiving bays formed therein;
   a plurality of detent mechanisms mounted on said housing and associated with said plurality of bays, each of said detent mechanisms having a media retaining operating position and a media releasing operating position;
   a lock mechanism mounted on said housing and having a detent locking operating position and a detent releasing operating position, wherein said detent locking operating position locks said plurality of detent mechanisms in said media retaining operating position;
   a handle pivotally mounted on said housing, said handle being biased toward a first operating position and being displacable to a second operating position; said lock mechanism and said handle being constructed and arranged such that said lock mechanism is in said detent locking operating position when said handle is in said second operating position and said lock mechanism is in said detent releasing operating position when said handle is in said first operating position.

10. The media holding device of claim 9 wherein grasping and lifting said handle at a central portion thereof causes said handle to be displaced from said first operating position to said second operating position whereby grasping and lifting said handle causes media pieces in said storage bays to be retained in said bays by said detent mechanism.

11. A method of securing a media piece within a media holding device comprising:
   locating a media piece in at least one media holding location in a media holding device;
   engaging a detent element with said media piece as said media piece is removed from said at least one media holding location;
   applying a first force between said detent element and said engaged media piece as said media piece is removed from said at least one media holding location;
   engaging said detent element with a locking mechanism which causes a second force greater than said first force to be applied between said detent element and said media piece as said media piece is removed from said at least one media holding location;

lifting a media handling device handle to engage said detent element with said locking mechanism.

12. A means for securing a media piece comprising:

a media holding means for holding a media piece;

a detent means for releasably contacting said media piece as said media piece is removed from said media holding means;

a locking means for releasably locking said detent means in a position which prevents removal of said media piece from said media holding means;

a pivotal handle means pivotal between a carrying position and a non-carrying position for grasping and lifting by a handle to hand carry said media holding means and for engaging said locking means to lock said detent means in said position which prevents removal of said media piece when said handle means is in said carrying position whereby hand carrying said media holding means by said handle causes said media piece to be lockingly retained in said media holding means.

\* \* \* \* \*